United States Patent [19]

Blanke

[11] 4,175,427
[45] Nov. 27, 1979

[54] ENGINE FAULT ANALYSIS ON CATALYTIC CONVERTER EQUIPPED AUTOS

[75] Inventor: John D. Blanke, Fullerton, Calif.

[73] Assignee: Beckman Instruments, Inc., Fullerton, Calif.

[21] Appl. No.: 933,246

[22] Filed: Aug. 14, 1978

[51] Int. Cl.² .......................................... G01M 15/00
[52] U.S. Cl. ...................................... 73/118; 364/431
[58] Field of Search ................... 73/118, 116, 23, 117, 73/117.3; 123/119 R; 364/431

[56] References Cited

U.S. PATENT DOCUMENTS

| 3,998,095 | 12/1976 | Tinkham et al. | 73/117 |
| 4,108,362 | 8/1978 | Trussell et al. | 73/116 X |

Primary Examiner—Jerry W. Myracle
Attorney, Agent, or Firm—Robert J. Steinmeyer; Paul R. Harder; Frank J. Kowalski

[57] ABSTRACT

An apparatus and method to isolate faults in a catalytic converter equipped internal combustion engine.

The exhaust is analyzed to determine hydrocarbon content, carbon monoxide content and oxygen content and this data is processed through an electronic circuit which accumulates information to be disclosed at the termination of testing.

12 Claims, 5 Drawing Figures

ENGINE FAULT ANALYSIS ON CATALYTIC CONVERTER EQUIPPED AUTOS

BACKGROUND OF THE INVENTION

The present invention relates to a method and apparatus for isolating faults in an internal combustion engine equipped with a catalytic converter and more particularly to a method and apparatus for determining internal combustion engine faults through analysis of the exhaust to determine hydrocarbon content, carbon monoxide content, and oxygen content. Isolation of faults in a non-catalytic converter equipped internal combustion engine may be found in my copending application Ser. No. 933,248, filed on the same day, titled "Fuel Burning Efficiency Determination System."

Present internal combustion exhaust diagnostic procedures based upon carbon monoxide and hydrocarbon emissions are inadequate when used on catalytic converter equipped engines. The purpose and end result of the catalyst is to remove carbon monoxide and hydrocarbon from the exhaust, which essentially masks any problems which were previously identifiable through emission analysis. Furthermore, problems in the engine may distort the performance of the catalytic converter and indicate a faulty converter while it is operating properly. Prior art has developed systems to isolate engine and catalytic converter problems, but these systems require complicated test techniques which are both costly and time consuming. These test techniques require close contact with and visual inspection of both the engine and catalytic converter.

SUMMARY OF THE INVENTION

The present invention eliminates the need for underhood diagnostic measures by providing a reliable means of problem analysis in a catalytic converter equipped internal combustion engine through the analysis of hydrocarbon, carbon monoxide, and oxygen content in the engine exhaust. A gas analyzer is used to detect the extent of carbon monoxide, oxygen, and hydrocarbon emissions in the exhaust and the output of the gas analyzer are processed through an electronic circuit which accumulates information to be disclosed at the termination of testing. The test is run in two phases, a first phase, with the engine operating at an idle speed, and a second phase, with the engine operating at an off-idle speed, for example at 2500 RPM. Prior to conducting the tests carbon monoxide and hydrocarbon limits are set. During the first phase carbon monoxide content is compared with a first predetermined maximum. If this preselected maximum is exceeded a further determination as to which is greater carbon monoxide or oxygen is made. Analysis will indicate whether the engine is operating lean or rich. The second portion of the idle phase is a determination of the hydrocarbon content in the exhaust. If the hydrocarbon content exceeds a second predetermined maximum a further determination as to whether the carbon monoxide content or the oxygen content is greater is made. Depending on whether the engine is running rich or lean additional information will be generated at the termination of the entire test. The second phase of the test is run and again carbon monoxide content is measured and compared with a third predetermined maximum. A determination as to whether the engine is lean or rich will indicate whether the problem is engine caused or catalytic converter caused. The hydrocarbon content of the exhaust is again measured and compared with a fourth predetermined maximum. Richness or leaness, as indicated by the greater of carbon monoxide or oxygen emissions in the exhaust system, will determine whether any problems exist in the engine or the catalytic converter. At the termination of the two phase test information which has been accumulated is called out and disclosed to the repairman.

Thus, on the basis of this simple two phase, three gas analysis test, problems can be isolated as to whether engine caused or catalytic converter caused. The present invention eliminates time-consuming and costly test procedures to determine the source of problems in catalytic converter equipped automobile engines.

DESCRIPTION OF THE PREFERRED EMBODIMENT

Figure 1:
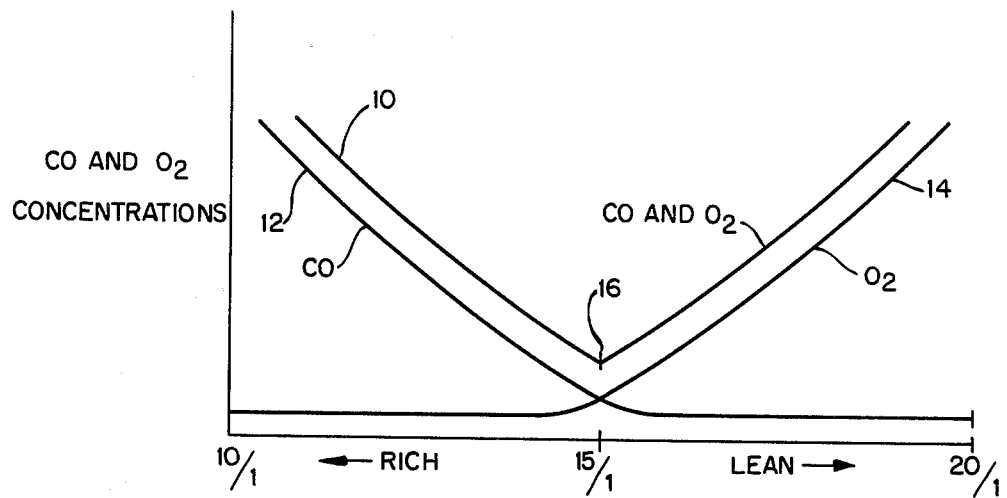
FIG. 1 is graphical representation illustrating carbon monoxide and oxygen concentrations as a function of the air to fuel ratio of the engine.

FIG. 1 illustrates a curve 20 as a representation of carbon monoxide plus the oxygen content in the exhaust, a curve 12 as a representation of carbon monoxide alone, and a curve 14 as a representation of oxygen alone, all three as a function of air to fuel ratio fed to the engine. As can be seen, the carbon monoxide concentration in the exhaust decreases almost linearly to an air fuel ratio of 15 to 1 and remains essentially constant as the air to fuel ratio becomes leaner to an air to fuel ratio of 20 to 1. The oxygen concentration in the exhaust remains at an essentially constant value until an air to fuel ratio mixture of 15 to 1 is achieved. At this point, the oxygen concentration increases linearly to a point representing an air fuel ratio of 20 to 1. Curve 10, representing the carbon monoxide plus oxygen concentrations in the exhaust, decreases linearly down to an air fuel ratio of 15 to 1 where it reverses slope and increases linearly. The point of inflection on curve 10 is indicated at point 16 which corresponds to the intersecting point of the carbon monoxide and oxygen concentration curves. At point 16, or an air fuel ratio of 15 to 1, the engine is burning at its most efficient point. At an air to fuel ratio greater than 15 to 1 the engine is burning too lean while at an air to fuel ratio of less than 15 to 1 the engine is burning to rich and total combustion of fuel is not taking place.

Figure 2:
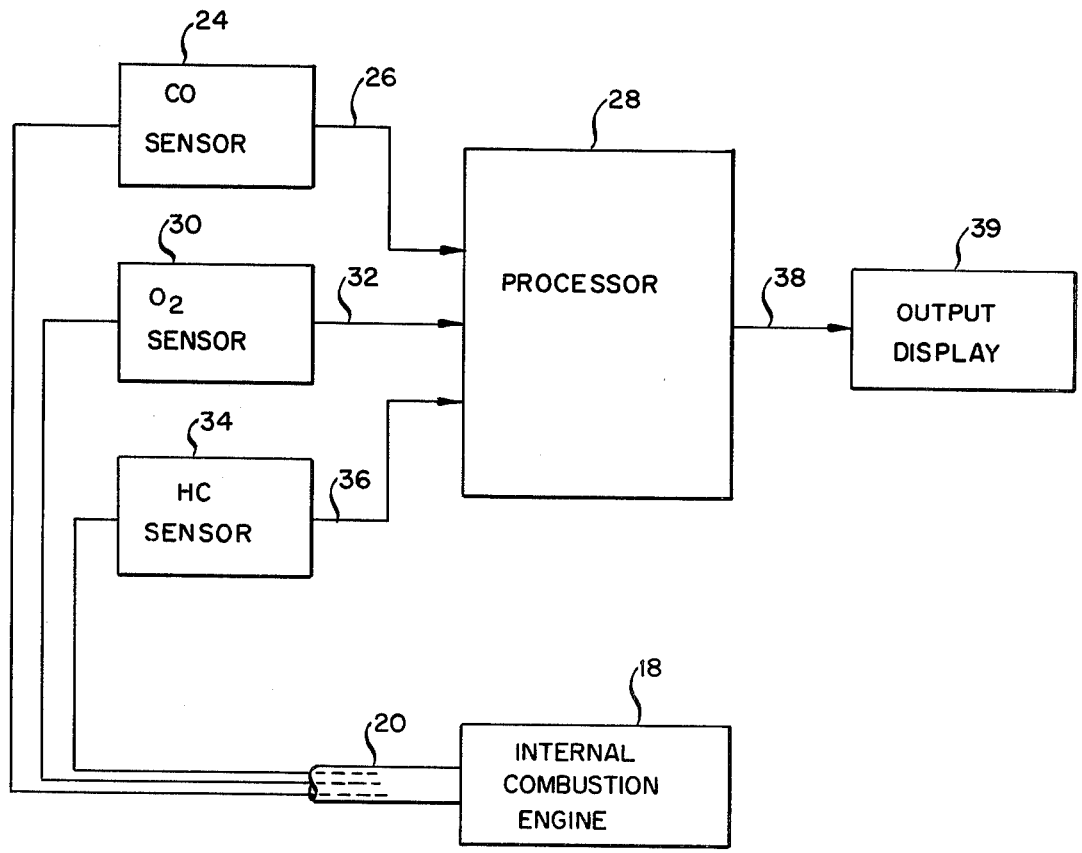
FIG. 2 is a basic block diagram of the present invention.

Referring now to FIG. 2 an internal combustion engine 18 having an exhaust 20 is shown associated with carbon monoxide sensor 24 which is connected through line 26 to processor 28, with oxygen sensor 30 which is connected through conductor 32 to processor 28 and with hydrocarbon sensor 34 which is connected through conductor 36 to processor 28. The processor circuit 28 in turn is connected on its output side through conductor 38 to an output display 39 which produces the finalized information based on the information gathered by the oxygen, hydrocarbon and carbon monoxide sensors.

Figure 3:
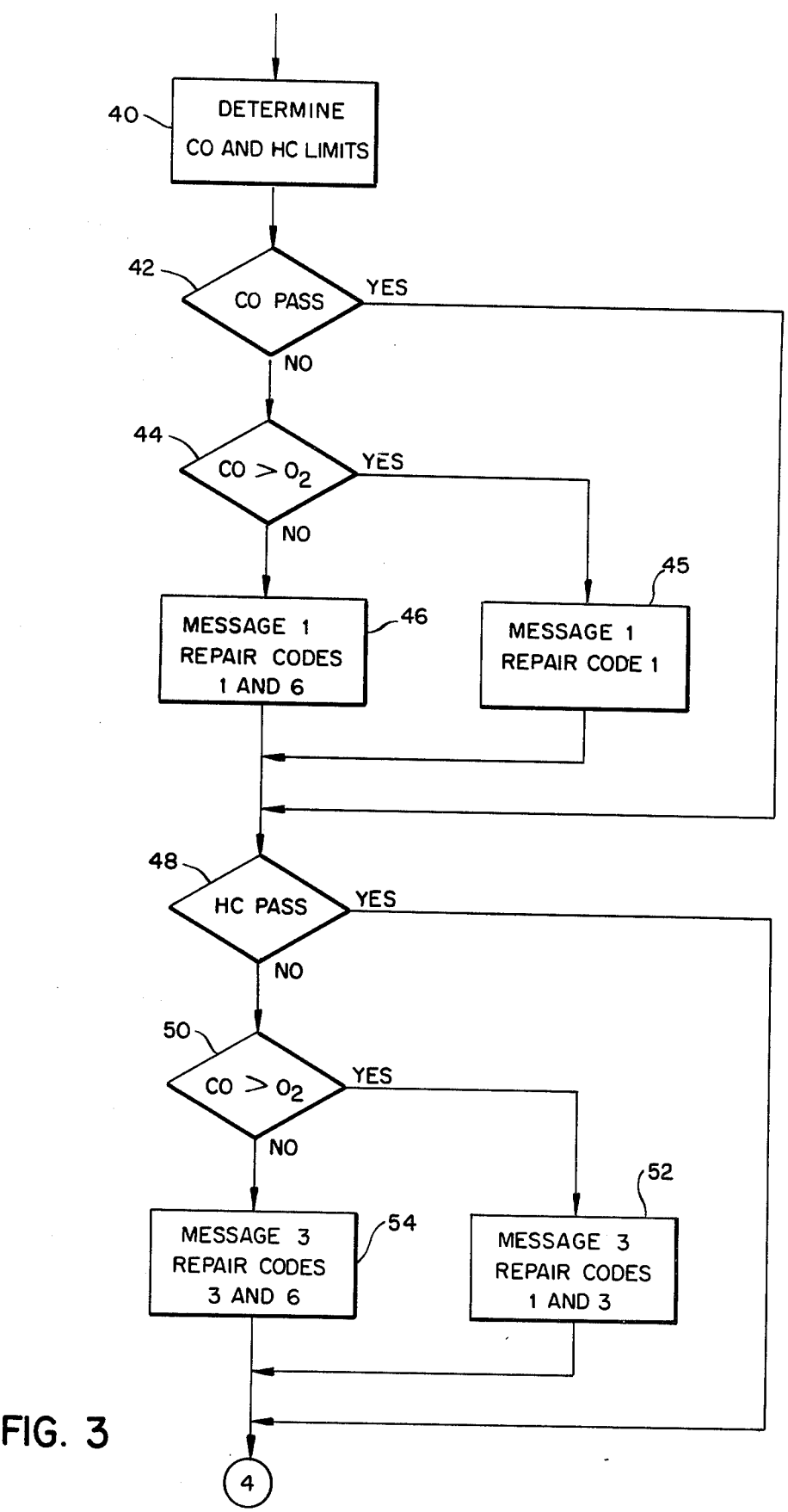
FIGS. 3 and 3A comprise a block diagram illustrating the basic algorithm of the present invention.
Figure 3A:
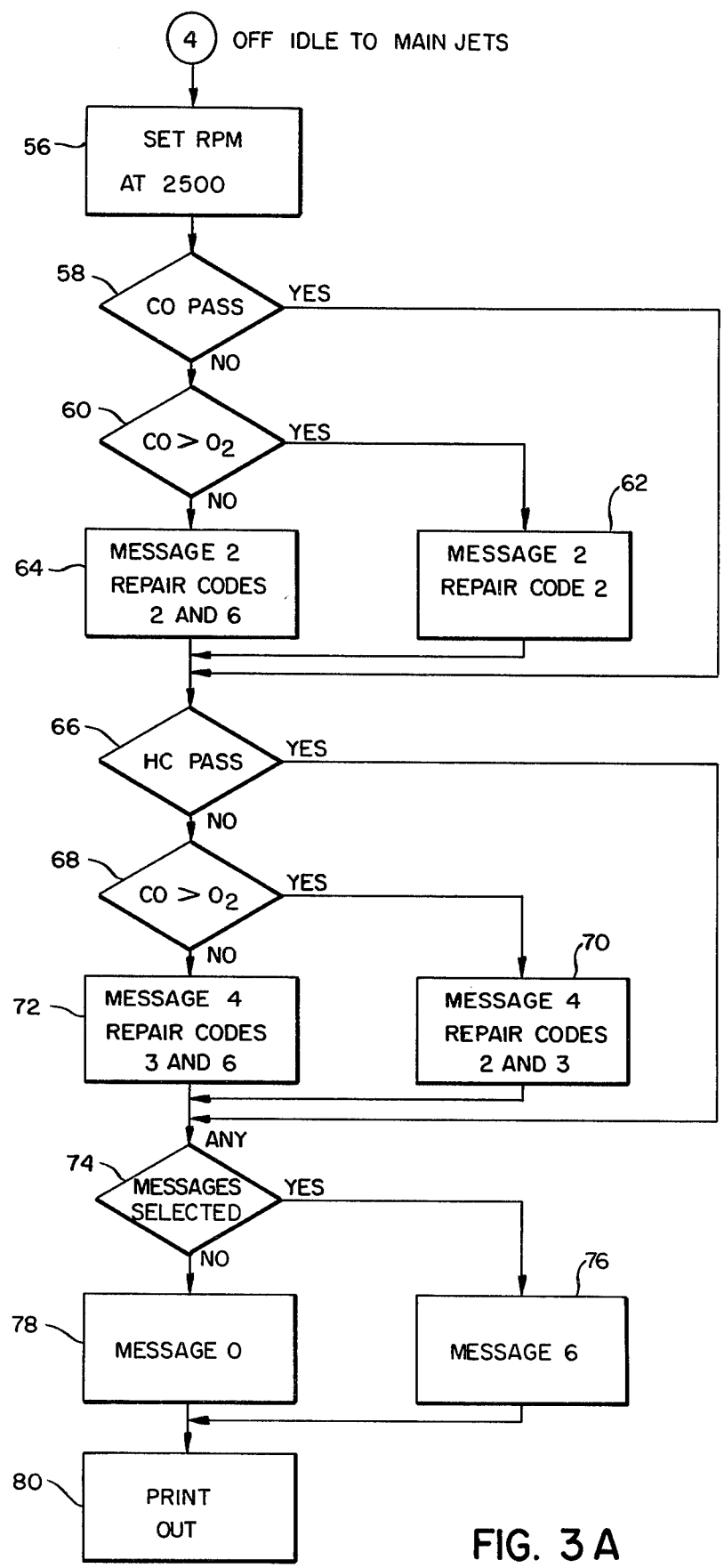

FIGS. 3 and 3A illustrate the basic algorithm of the present invention in block form. The testing is performed in two phases, first while the engine is operating at idle speed and second while the engine is operating at an off-idle speed such as 2500 r.p.m. During the two phases of the test, exhaust emissions are analyzed for excess carbon monoxide and hydrocarbon, comparing the sensed amount with a predetermined maximum for each. When the hydrocarbon or carbon monoxide emission exceed the predetermined maximums, isolation of the source of the problem can be determined by a comparison of the carbon monoxide emissions with the oxygen emissions. This comparison will indicate whether the carburetor is running rich or lean and thus provide an indication of the source of the problem. Based upon the information gathered during various portions of each phase of the testing, messages and repair codes are stored and called out when the testing is finished. The messages and repair codes of the preferred embodiment are as follows.

| Diagnostic Messages | |
| --- | --- |
| Message # | Message |
| 0 | Passed, no repair required |
| 1 | CO failed at idle |
| 2 | CO failed off idle |
| 3 | HC failed at idle |
| 4 | HC failed off idle |
| 5 | HC failure at both speeds |
| 6 | Failed testing, use repair procedures _,_,_ |

| Repair Codes | |
| --- | --- |
| Code # | Repair Action |
| 1 | Adjust idle mixture screws |
| 2 | Carburetor overhaul required |
| 3 | Get engine tune up |
| 4 | Use further diagnostic steps to isolate problem |
| 5 | Balance carburetor |
| 6 | Replace catalytic converter |

During the first phase of the test the engine is operated at an idle speed. The first portion of this phase of the test commences with a measurement of the carbon monoxide emissions from the exhaust which are then compared with a predetermined maximum. If the carbon monoxide emissions exceed this predetermined maximum, a determination is made as to whether carbon monoxide emissions or the oxygen emissions are greater in the exhaust. If the carbon monoxide emissions are greater than the oxygen emissions, the engine is running rich, whereas if the carbon monoxide emissions are less than the oxygen emissions, the engine is running lean. If the engine is running rich, the carburetor must be adjusted before a valid decision can be made concerning the effectiveness of the catalyst. If the engine is running lean and high carbon monoxide emissions are still present, the catalyst is getting the proper mixture. However, the carbon monoxide is not oxidized. This means that the converter is bad plus the carburetor may need to be adjusted.

The second portion of the idle phase of the test concerns the measurement of the hydrocarbons in the exhaust emissions. The hydrocarbon emissions are measured and compared against a second predetermined maximum. If the hydrocarbon emissions are below this predetermined maximum, no problem exists. However, if the hydrocarbon emissions are greater than this predetermined maximum, then a determination as to whether or not the engine is operating on a rich mixture or a lean mixture is again warranted. If the engine is running on a rich mixture as indicated by greater carbon monoxide emissions than oxygen emissions, the carburetor must be adjusted before an accurate analysis can be obtained. However, the high hydrocarbon emissions probably cannot be due to a rich mixture only so the ignition system must also be checked. If the engine is operating on a lean mixture, as indicated by greater oxygen emissions than carbon monoxide emissions, the catalytic converter is definitely faulty. Furthermore, the mere presence of high hydrocarbon emissions may indicate that the problem may also lie in the ignition system of the automobile since the high hydrocarbon emissions could be the result of two problems, not just a bad catalytic converter.

Now the test proceeds to its second phase, that is operating off idle at a speed such as 2500 r.p.m.'s. The first test is again a measurement of the carbon monoxide emissions in comparison with a third predetermined maximum. The third predetermined maximum for carbon monoxide emissions at an off idle speed is preferably twice the predetermined maximum for carbon monoxide emissions at an idle speed. If the engine fails, the carbon monoxide portion of the off idle test again a determination of richness or leanness is made. If the engine is operating rich, that is carbon monoxide emissions greater than oxygen emissions, the catalyst cannot burn the carbon monoxide. Therefore, the off idle richness problem must be solved by measures beyond the scope of the present invention. If the engine operation is lean, as indicated by greater oxygen emissions than carbon monoxide emissions, the catalyst should have removed the excess carbon monoxide. Since it did not, the catalytic converter is faulty and should be replaced. Additionally, the excess carbon monoxide should not have been there; therefore the carburetor is probably running to rich at off idle. Again, the richness cause must be isolated which is beyond the scope of the present invention.

The next portion of the off idle phase test requires that the hydrocarbon emissions again are measured and compared with a fourth predetermined maximum. The fourth predetermined maximum for hydrocarbon emissions at an off idle speed are preferably twice that of the hydrocarbon emissions at an idle speed. If the engine fails this portion of the test again, richness or leanness is important. If the engine is operating at a rich mixture and the hydrocarbon emissions exceed a predetermined maximum, two faults are indicated. First, an engine tune up is required and second, the richness cause must be isolated which again is beyond the scope of the present invention. If the engine failed the hydrocarbon emissions portion of the test and it is indicated that the engine is operating on a lean mixture, that is oxygen greater than carbon monoxide, the catalytic converter is faulty and should be replaced and the ignition system is probably faulty.

Thus, through the comparison of hydrocarbon emissions and carbon monoxide emissions with predetermined maximums, it can be determined whether or not any problems exist with the engine. Once the problem is located, a comparison of the carbon monoxide emissions with the oxygen emissions can indicate whether the problem exists in the catalytic converter or whether it is a carburetor or ignition related problem.

Referring to FIG. 3, block 40 indicates the point where predetermined maximum limits for carbon monoxide and hydrocarbon are dictated to the system.

Block 42 represents the comparison of the carbon monoxide emissions with the predetermined maximum. If the carbon monoxide emissions are greater than the predetermined maximum, block 44 indicates that a test is performed to determine whether carbon monoxide is greater than the oxygen content in the exhaust or vice versa. If the carbon monoxide is greater than the oxygen content then as indicated at block 45, message 1 indicating that the engine failed the CO test at idle with repair code 1, requiring adjustment of idle mixture screws, is initiated and stored. If oxygen is greater than the carbon monoxide emission then message 1 with repair code 1 is initiated with repair code 6, requiring replacement of the catalytic converter, and stored as indicated at block 46. Upon completion of the carbon monoxide portion of the idle phase of the test, the hydrocarbon emissions are then tested. If the hydrocarbon emissions are greater than a second predetermined maximum, as indicated at block 40, the further test of whether carbon monoxide exceeds oxygen is again performed at block 50. If the carbon monoxide content is greater than the oxygen content then, as illustrated at block 52, message 3 indicating that the engine failed HC at idle with repair codes 1 requiring air fuel mixture adjustment and 3 requiring an engine tune up is stored. If oxygen is greater than carbon monoxide in the exhaust then message 3 with repair code 3 and repair code 6 requiring replacement of the catalytic converter is stored at block 54. At this point the idle phase of the test is complete and the off-idle portion is begun.

Referring now to FIG. 3A, the engine RPM is set at some speed off-idle preferably at 2500 RPM and the testing is begun with comparison of carbon monoxide emissions with the a third predetermined maximum placed into the electronic circuit at block 40. If the carbon monoxide emissions exceed the third predetermined maximum then carbon monoxide and oxygen levels are compared as indicated at block 58. If the carbon monoxide levels exceed the oxygen level in the exhuast emissions then message 2 indicating that the engine failed CO off idle, and repair code 2 requiring a carburetor overhaul is stored. If the oxygen level exceeds the carbon monoxide level, then message 2 with repair code 2 is stored along with repair code 6 requiring the replacement of the catalytic converter. The test proceeds as illustrated at block 66 to a comparison of the hydrocarbon emissions against a fourth predetermined maximum. If the hydrocarbon emissions exceed this fourth predetermined maximum, the carbon monoxide and oxygen emissions are compared as shown at block 68. If the carbon monoxide emissions are greater than the oxygen emissions as shown in block 70 message 4 indicating that the engine failed HC off idle with repair codes 2 requiring carburetor overhaul and 3 requiring an engine tune up, is stored. If the oxygen emissions are greater than the carbon monoxide emissions thenmessage 4 with repair code 3 and repair code 6 requiring that the catalytic converter be replaced is stored as shown at block 72. The final step in the test procedure is shown at block 74, at which point it is determined whether or not any messages have been selected. If any messages have been selected then message 6 indicating that the engine failed testing is issued along with the messages and repair codes which had been initiated. If no messages had been selected then message 0 indicating a complete pass of the test is issued or printed out.

Figure 4:
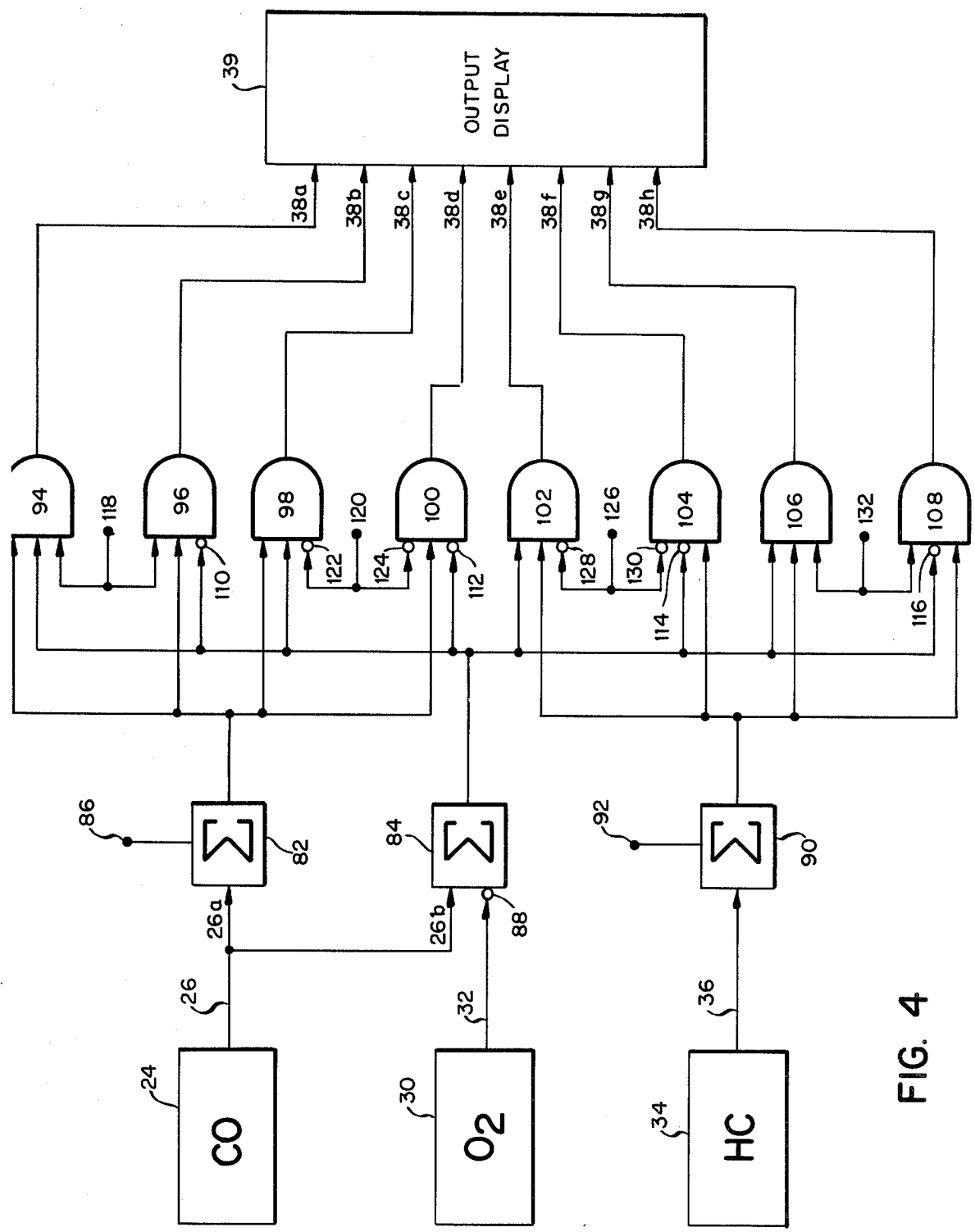
FIG. 4 is a partial block partial schematic diagram of the processor of FIG. 2.

FIG. 4 illustrates an electronic circuit which accomplishes the algorithm the intent of the present invention. Although the electronic circuit is shown comprising summing circuits, biasing nodes and AND gates coupled with inverters it is to be understood that anyone skilled in the art can accomplish the same end result with the use of NOR gates, AND gates, NAND gates, etc., or a microprocessor. Electronic circuit 28 defines a true signal as a positive voltage and further defines the idle state as the presence of a true signal at the four illustrated idle nodes. Permissible limits for carbon monoxide and hydrocarbon emissions are represented by negative voltage at the two biasing nodes feeding the summing circuits which receive only one input from sensors 24, 30 or 34. Output display 39 may be any audio or visual display such as an alarm, series of lights or the like. However, the output display of the preferred embodiment is preferably a cathode ray tube.

The output of carbon monoxide sensor 24 is fed to summing circuit 82 through conductor 26a and summing circuit 84 through conductor 26b. Summing circuit 82 also receives an input from biasing node 86. Oxygen sensor 30 feeds summing circuit 84 through conductor 32 and inverter 88. Hydrocarbon sensor 34 feeds summing circuit 90 through conductor 36. Summing circuit 90 also receives negative voltage input from biasing node 92. Summing circuit 82 in turn feeds AND gate 94, AND gate 96, AND gate 98, and AND gate 100. Summing circuit 90 in turn feeds AND gate 102, AND gate 104, AND gate 106, and AND gate 108. Summing circuit 84 feeds AND gate 94, AND gate 96 through inverter 110, AND gate 98, AND gate 100 through inverter 112, AND gate 102, AND gate 104 through inverter 114, AND gate 106 and AND gate 108 through inverter 116. AND gates 94 and 96 receive a third input from idle node 118. AND gates 98 and 100 receive input from idle node 120 through inverters 122 and 124 respectively. AND gates 102 and 104 receive a third input from idle node 126 through inverters 128 and 130 respectively. AND gates 106 and 108 receive their third input from idle node 132.

AND gates 94, 96, 98, 100, 102, 104, 106 and 108 are connected to output display 39 through conductors 38a, 38b, 38c, 38d, 38e, 38f, 38g and 38h respectively.

Biasing nodes 86 and 92 supply voltages representative of the carbon monoxide maximum limits and the hydrocarbon maximum limits to summing circuit 82 and 90 respectively. Idle nodes 118, 120, 126, and 132 produce true signals whenever the automobile engine is being operated at idle speed, while producing a false signal otherwise.

Carbon monoxide sensor 24 produces a positive output indicative of the extent of carbon monoxide emissions in the exhaust of the automobile engine. As positive voltage is combined with a negative biasing voltage indicative of the safe limit of carbon monoxide emissions at summing circuit 82. When the carbon monoxide emission exceeds a predetermined maximum a true signal will be issued by summing circuit 82 and fed to AND gates 94, 96, 98, and 100. AND gates 98 and 100 will receive a negative or false signal through inverters 122 and 124 when the engine is operating at idle and will not produce an output to output display 40. AND gates 94 and 96 will receive a true signal from idle node 118 whenever the engine is operating at idle speed and which gate produces an output will be determined by the input from summing circuit 84. Summing circuit 84 will receive a positive voltage indicative of carbon monoxide emissions in the exhaust from carbon monoxide sensor 24 through conductor 26b while receiving a negative voltage indicative of the oxygen emissions in the exhaust of the automobile engine from oxygen sensor 30 through conductor 32 which is inverted or made proportionally negative through invertor 88. If carbon monoxide emissions are greater than the oxygen emissions a positive voltage or a true signal will be issued by summing circuit 84 to AND gates 94 and 96. A true signal to AND gate 96 will pass through inverter 110 and be turned into a false signal, therefore no output will be issued to display output 39. The presence of three inputs to AND gate 94 will result in an output to output display 40 which will call out message 1 indicating that carbon monoxide failed at idle and repair code 1 indicating that the air/fuel mixture screws must be adjusted at idle on the carburetor.

During the idle phase of the test hydrocarbon emissions will be determined by hydrocarbon sensor 34 and fed to summing circuit 90 through conductor 36. In summing circuit 90 positive voltage indicative of the hydrocarbon emissions in the exhaust are combined with a negative voltage from biasing node 92 indicating the safe limit of hydrocarbon emissions in the exhaust. AND gates 102 and 104 are disabled by a false signal from inverters 128 and 130 during the idle phase of the test while AND gates 106 and 108 will receive a true input. Thus, with high hydrcarbon emissions during the idle phase of the test AND gates 106 and 108 are both capable of producing a true output which will be determined by the third input which is received from summing circuit 84. If the carbon monoxide emissions are greater than the oxygen emissions a true signal will be issued by summing circuit 84 which will produce an output in AND gate 106 calling out message 3 indicating hydrocarbon failed at idle and repair codes 1, adjust idle mixture screws, and 3, obtain an engine tune-up. If the oxygen emissions are greater than the carbon monoxide emissions then a false signal is issued by summing circuit 84 which will be inverted at inverter 116 to produce a true output from AND gate 108 which calls message 3 indicating that hydrocarbon failed at idle and repair codes 3 get ignition tune-up and 6 replace catalytic converter in output display 39.

When the off-idle phase of the test is being run idle node 118 will issue a false signal disabling AND gates 94 and 96 and idle node 120 will also issue a false signal which will be inverted to a true through inverters 122 and 124 producing potential outputs from AND gates 98 and 100. Similar to the idle phase of the test, AND gates 98 and 100 will produce a true output only when the carbon monoxide emissions exceed predetermined maximum as represented by the negative voltage from biasing node 86. When a carbon monoxide emission exceeds the pre-determined maximum during the off-idle phase of the test, a true output from either AND gate 98 or AND gate 100 is determined by the output from summing circuit 84. As indicated previously, a true output will be issued by summing circuit 84 whenever the carbon monoxide emissions exceed the oxygen emissions in the exhaust thus producing a true output from AND gate 98 which calls out message 2 indicating that carbon monoxide failed off-idle and repair code 2 requiring that the carburetor be overhauled. When a carbon monoxide emissions are less than the oxygen emissions a false signal will be issued by summing circuit 84 which will be inverted through inverter 112 to produce a true output from AND gate 100 which will call out message 2, the engine failed CO off-idle and repair codes 2 indicating that the carburetor overhaul is required and 6 indicating that the catalytic converter must be replaced in output display 39.

During the off-idle phase of the test a false signal will be issued by idle node 132 disabling AND gates 106 and 108 while a false signal from idle node 126 will be inverted to a true signal through inverters 128 and 130 to produce a true input to AND gates 102 and 104 respectively. As previously indicated, high hydrocarbon emissions will produce a true output from summing circuit 90 thus enabling both AND gates 102 and 104 while hydrocarbon emissions below the predetermined maximum will produce a false output disabling AND gates 102 and 104. Whenever high hydrocarbon emissions are present during the off-idle phase of the test the output of AND gates 102 and 104 will be determined by comparison of carbon monoxide with oxygen emissions in the exhaust. When the carbon monoxide emissions exceed the oxygen emissions a true signal will be issued to AND gate 102 calling out message 4 indicating that hydrocarbon failed off-idle along with repair codes 2 requiring that the carburetor be overhauled and 3 requiring that the engine be tuned up in output display 39. When the oxygen emissions are greater than the carbon monoxide emissions in the exhaust a false signal will be issued by summing circuit 84 which will be inverted into a true signal through inverter 114 and fed to AND gate 104 as a true signal. AND gate 104 will then issue a true output which will call out message 4 indicating that the hydrocarbon failed off-idle and repair code 3 requiring that the engine be tuned up and 6 requiring replacement of the catalytic converter in output display 39.

As indicated in the foregoing description the method and apparatus of the present invention permit isolation of problems in catalytic converter equipped automobile engines by indicating source of the problems. The foregoing description illustrates one embodiment of the present invention and is shown by way of illustration only and not to limit the invention thereto but only by proper scope with the following claims.

What is claimed is:

1. Apparatus for isolating engine and catalytic converter problems on a catalytic converter equipped internal combustion engine having an exhaust, said engine having an idle state and an off idle state, said apparatus comprising:

analyzer means associated with the exhaust of the internal combustion engine for determining a carbon monoxide content, an oxygen content, and a hydrocarbon content of the exhaust and producing a first, second and third signal respectively proportionate thereto;

first means connected to said analyzer means for producing a first output when said first signal exceeds a first predetermined maximum and said first signal is greater than said second signal while said engine is in said idle state;

second means connected to said analyzer means for producing a second output whenever said first signal exceeds said predetermined maximum and said second signal is greater than said first signal while said engine is in said idle state;

third means connected to said analyzer means for producing a third output whenever said third signal exceeds a second predetermined maximum and said first signal is greater than said second signal while said engine is in said idle state;

fourth means connected to said analyzer means for producing a fourth output whenever said third signal exceeds said second predetermined maximum and said second signal is greater than said first signal while said engine is in said idle state;

fifth means connected to said analyzer means for producing a fifth output whenever said first signal exceeds a third predetermined maximum and said first signal is greater than said second signal while said engine is in said off idle state;

sixth means connected to said analyzer means for producing a sixth output whenever said first signal exceeds said third predetermined maximum and said second signal is greater than said first signal while said engine is in said off idle state;

seventh means connected to said analyzer means for producing a seventh output whenever said third signal exceeds a fourth predetermined maximum and said first signal is greater than said second signal while said engine is in said off idle state;

eighth means connected to said analyzer means for producing an eighth output whenever said third signal exceeds said fourth predetermined maximum and said second signal is greater than said first signal while said engine is in said off idle state; and display means connected to first means, second means, third means, fourth means, fifth means, sixth means, seventh means and eighth means for producing information in response to said first, second, third, fourth, fifth, sixth, seventh and eighth outputs.

2. The apparatus according to claim 1 wherein said analyzer means comprises:
 a CO means for determining said carbon monoxide content and producing said first signal proportionate thereto;
 an $O_2$ means for determining said oxygen content and producing said second signal proportionate thereto; and
 an HC means for determining said hydrocarbon content and producing said third signal proportionate thereto.

3. The apparatus according to claim 1 wherein said display means comprises a cathode ray tube.

4. The apparatus according to claim 1 wherein said display means comprises a series of lights.

5. An apparatus for isolating engine and catalytic converter problems on a catalytic converter equipped internal combustion engine with an exhaust, said engine having an idle state and an off-idle state, said apparatus comprising:
 analyzer means associated with the exhaust of the internal combustion engine for determining a carbon monoxide content, an oxygen content, and a hydrocarbon content of the exhaust and producing a first, second, and third signal respectively proportionate thereto;
 a response means connected to said analyzer means for producing a first output whenever said first signal exceeds a first predetermined maximum and said first signal is greater than said second signal, a second output when the first signal exceeds said first predetermined maximum and second signal is greater than said first signal, a third output whenever said third signal exceeds a second predetermined maximum and said first signal is greater than said second signal, and a fourth output whenever said third signal exceeds said second predetermined maximum and said second signal is greater than said first signal, while said internal combustion engine is in said idle state, and while said internal combustion engine is in said off idle state for producing a fifth output whenever said first signal exceeds a third predetermined maximum and said first signal is greater than said second signal, a sixth output whenever said first signal exceeds said third predetermined maximum and said second signal is greater than said first signal, a seventh output whenever said third signal exceeds a fourth predetermined maximum and said first signal is greater than said second signal and an eighth output whenever said third signal exceeds said fourth predetermined maximum and said second signal is greater than said first signal; and display means connected to said response means for producing information in response to said first, second, third, fourth, fifth, sixth, seventh, and eighth outputs.

6. The apparatus according to claim 5 wherein said analyzer means comprises:
 first means for determining said carbon monoxide content and producing said first signal proportionate thereto;
 second means for determining oxygen content and producing said second signal proportionate thereto; and
 third means for determining said hydrocarbon content and producing said third signal proportionate thereto.

7. The apparatus according to claim 6 wherein said response means comprises a programmable microprocessor.

8. The apparatus according to claim 7 wherein said display means comprises a cathode ray tube.

9. The apparatus according to claim 7 wherein said display means comprises a series of lights.

10. In combination:
 a catalytic converter equipped internal combustion engine having an exhaust;
 analyzer means associated with the exhaust of the internal combustion engine for determining a carbon monoxide content, and oxygen content, and a hydrocarbon content of the exhaust and producing a first, second, and third signal respectively proportionate thereto;
 a response means connected to said analyzer means for producing a first output whenever said first signal exceeds a first predetermined maximum and said first signal is greater than said second signal, a second output when the first signal exceeds said first predetermined maximum and second signal is greater than said first signal, a third output whenever said third signal exceeds a second predetermined maximum and said first signal is greater than said second signal, and a fourth output whenever said third signal exceeds said second predetermined maximum and said second signal is greater than said first signal, while said internal combustion engine is in said idle state, and while said internal combustion engine is in said off idle state for producing a fifth output whenever said first signal exceeds a third predetermined maximum and said first signal is greater than said second signal, a sixth output whenever said first signal exceeds said third predetermined maximum and said second signal is greater than said first signal, a seventh output whenever said third signal exceeds a fourth predetermined maximum and said first signal is greater than said second signal and an eighth output whenever said third signal exceeds said fourth predetermined maximum and said second signal is greater than said first signal; and display means connected to said response means for producing information in response to said first, second, third, fourth, fifth, sixth, seventh, and eighth outputs.

11. A method for isolating engine and catalytic converter problems on a catalytic converter equipped internal combustion engine including the steps of:

operating the internal combustion engine at an idle speed;

sensing the carbon monoxide emissions in the exhaust of said internal combustion engine and producing a first output when said carbon monoxide emissions exceed a first predetermined maximum and said carbon monoxide emissions exceed oxygen emissions while producing a second output if said oxygen emissions exceed said carbon monoxide emissions;

sensing the hydrocarbon emissions in the exhaust of said internal combustion engine and producing a third output if said hydrocarbon emissions are greater than a second predetermined maximum and said carbon monoxide emissions are greater than said oxygen emissions while producing a fourth output when said oxygen emissions are greater than said carbon monoxide emissions;

operating the internal combustion engine at an off-idle speed;

sensing the carbon monoxide emission in the exhaust of said internal combustion engine and producing a fifth output when said carbon monoxide emissions are greater than a third predetermined maximum and said carbon monoxide emissions are greater than said oxygen emissions while producing a sixth output when said oxygen emissions are greater than said carbon monoxide emissions; and sensing said hydrocarbon emissions in the exhaust of said internal combustion engine and producing a seventh output when said hydrocarbon emissions exceed a fourth predetermined maximum and said carbon monoxide emissions are greater than said oxygen emissions while producing an eighth output when said oxygen emissions are greater than said carbon monoxide emissions.

12. An apparatus for isolating problems in a catalytic converter equipped internal combustion engine having an idle state and an off idle state, said engine including a carburetor and exhaust, said apparatus comprising:

analyzer means for sensing carbon monoxide emissions, oxygen emissions and hydrocarbon emissions in said exhaust;

first means for producing a first response whenever said carburetor is out of balance as indicated by one of high carbon monoxide emissions while said engine is in said idle state or high hydrocarbon emissions with carbon monoxide emissions are greater than oxygen emissions while said engine is in said idle state;

second means for producing a second response whenever said carburetor needs to be overhauled as indicated by one of high carbon monoxide emissions while said engine is in said off idle state or high hydrocarbon emissions with carbon monoxide emissions greater than oxygen emissions while said engine is in said off idle state;

third means for producing a third response whenever said engine needs a tune up as indicated by high hydrocarbon emissions; and fourth means for producing a fourth response whenever the catalytic converter needs to be replaced as indicated by one of high carbon monoxide emissions with oxygen emissions greater than carbon monoxide emissions or high hydrocarbon emissions with oxygen emissions greater than carbon monoxide emissions.

* * * * *